(No Model.) 2 Sheets—Sheet 1.
G. E. COPPEN.
SPRING TRIP CULTIVATOR.
No. 594,463. Patented Nov. 30, 1897.
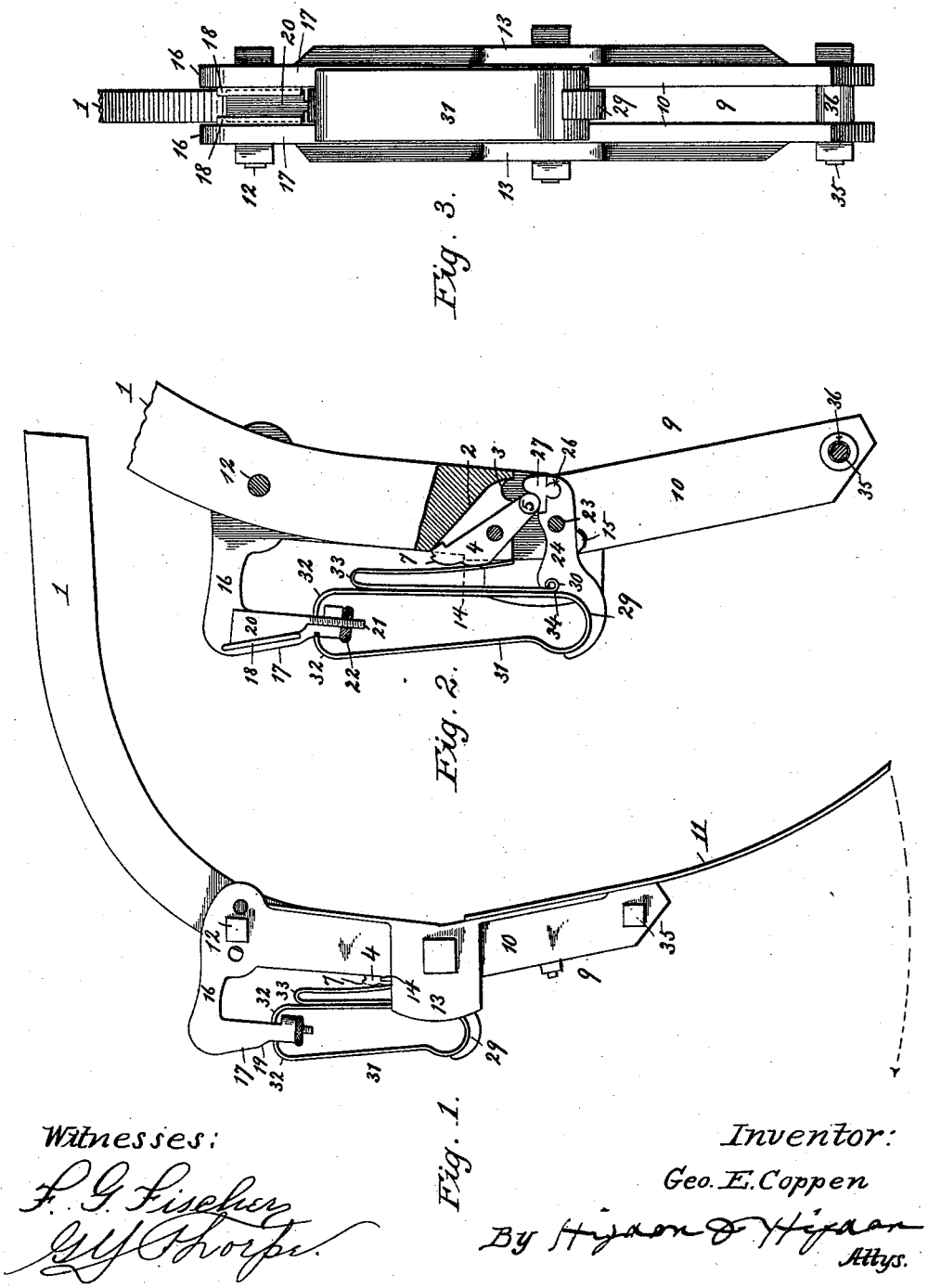
Witnesses:
F. G. Fischer
G. W. Thorpe
Inventor:
Geo. E. Coppen
By Hyson & Hyson
Attys.

(No Model.) 2 Sheets—Sheet 2.
G. E. COPPEN.
SPRING TRIP CULTIVATOR.
No. 594,463. Patented Nov. 30, 1897.
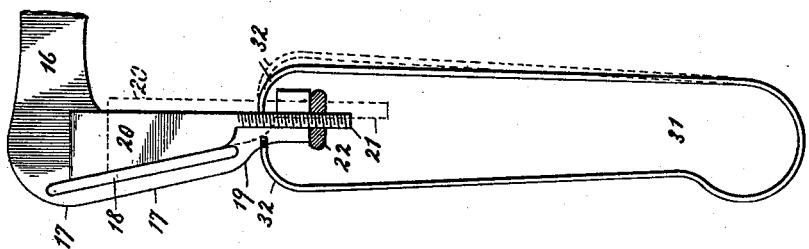
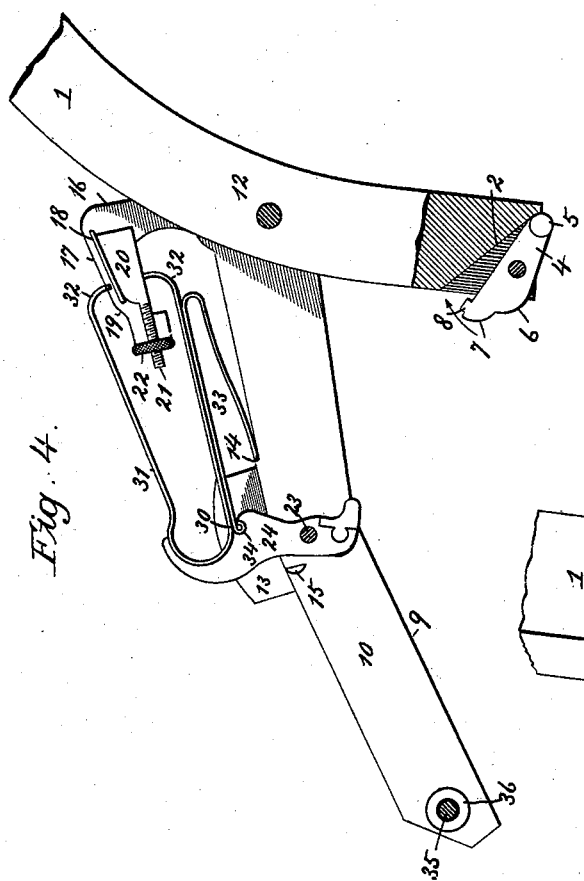
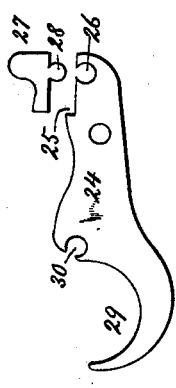
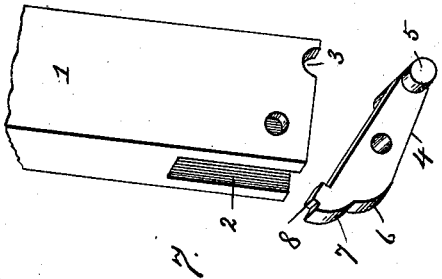
Witnesses.
F. G. Fischer
E. Y. Thorpe
Inventor:
Geo. E. Coppen
By Higdon & Higdon
Attys.

UNITED STATES PATENT OFFICE.

GEORGE E. COPPEN, OF SHEFFIELD, MISSOURI, ASSIGNOR OF ONE-HALF TO WILLIAM N. WOODARD, OF SAME PLACE.

SPRING-TRIP CULTIVATOR.

SPECIFICATION forming part of Letters Patent No. 594,463, dated November 30, 1897.

Application filed December 21, 1896. Serial No. 616,558. (No model.)

*To all whom it may concern:*

Be it known that I, GEORGE E. COPPEN, of Sheffield, Jackson county, Missouri, have invented certain new and useful Improvements in Spring-Trip Cultivators, of which the following is a full, clear, and exact description, reference being had to the accompanying drawings, forming a part thereof.

My invention relates to spring-trip cultivators; and it consists in certain novel and peculiar features of construction and combinations of parts, as will be hereinafter described and claimed.

In ordinary cultivators the pin holding the shank which carries the shovel frequently breaks under contact with a large obstruction, and said pin has to be replaced before work can be continued. Owing to this fact cultivators have been provided with spring-trips, and upon such spring-trip cultivators my invention is designed, primarily, as an improvement, my object being to produce a more practical and durable form of spring-trip and one which is more compact of construction and neat of appearance.

In order that the invention may be fully understood, I will proceed to describe it with reference to the accompanying drawings, in which—

Figure 1 represents in side view a part of a cultivator-beam provided with a spring-trip mechanism embodying my invention. Fig. 2 represents a sectional view of the same, enlarged, the shovel being omitted in this figure. Fig. 3 represents a rear view of the same. Fig. 4 represents a view similar to Fig. 2, except that the shovel-carrying mechanism occupies its inoperative position. Fig. 5 represents a detail sectional view on an enlarged scale. Fig. 6 represents a detail side view, enlarged, of the rocker. Fig. 7 represents a perspective view of the lower end of the beam and its dog detached therefrom.

In the said drawings, where like reference-numerals designate corresponding parts, 1 designates a cultivator-beam of the customary form, but provided at its lower end with a triangular-shaped recess 2 and semicircular notches 3, communicating with said recess at its lower and front end.

4 designates a dog which is pivoted in such bifurcation and is provided with oppositely-projecting cylindrical shoulders 5 at its front end. At its opposite end, which is the heaviest end, it is formed with a rounded heel 6 and a toe 7 upon the same, and said toe is provided, preferably, with a lug 8 for contact with the inclined wall of the recess to limit the pivotal movement of the dog in one direction.

9 designates a frame comprising the parallel and similar castings 10, which snugly embrace the opposite sides of the cultivator-beam and project beyond the lower end of the same. Bolted to the lower portions of said frame, as shown in Fig. 1, or in any other suitable manner, is the customary shovel 11, and the upper ends of said arms are pivotally mounted upon the bolt 12, carried by the brake-beam. Said arms are provided with rearwardly-projecting ears 13 at opposite sides of their middle, and just above said ears they are formed with a shoulder 14, for a purpose to be hereinafter explained. Near the lower edge of said ears 13 the shovel-carrying frame, formed conjointly by said arms 10, is provided internally with one or more stop-lugs 15, for a purpose to be presently explained, and at its upper end it is provided with rearwardly-projecting parallel arms 16, provided with depending extensions 17, one of said arms being cast with each member 10 of the frame.

The rear face or edge of the pendent extensions of the arms 16 converge downwardly with reference to their front vertical edges and parallel with such beveled rear edges. Said extensions are formed with the inwardly-projecting guide-ribs 18. The beveled edges of said extensions at their lower ends terminate in substantially abrupt inclined shoulders 19, which form in practice resistance-points which prevent the shovel from yielding to anything short of an unnatural obstruction—that is to say, if the shovel strikes a stone, a root, or other substance foreign to the soil the resistance of said shoulders will be overcome and the shovel will yield, but not otherwise. This will be more particularly referred to hereinafter. These arms will hereinafter be referred to as the "tension-arms."

20 designates a wedge-block which fits snugly and adjustably between the tension-arms 16 and has its rear edge beveled to correspond with and bearing against the inclined ribs 18. Said block terminates in a threaded extension 21, engaged by a set-screw 22, which finds a bearing against the lower diminished ends of the said tension-arm. By proper manipulation of said set-screw the wedge-block may be moved upwardly or downwardly, and consequently the width of the tension-arm from front to rear will be diminished or increased, respectively, as indicated by dotted lines in Fig. 5. Thus it will be seen that said wedge-block in effect forms practically a part of said tension-arm, and is provided that the resistance of the shovel may be gaged by the nature or condition of the soil to be turned.

Just above the stop-lugs 15 the frame is bridged by the transverse bolt 23, and mounted thereon between the members of said frame is a rocker 24, the major portion of said rocker projecting to the rear. At its front upper corner it is recessed to form a seat 25 and the communicating notch 26. A headed plug 27 occupies said seat and is provided with a lug 28, which engages the notch 26. The connection between them is practically a dovetail connection. This soft-iron plug is provided owing to the fact that more or less frictional contact is imposed upon the rocker at this point. If this removable plug were not provided, it would be necessary at frequent intervals to replace the entire rocker, but when provided with said plug the latter only need be replaced at frequent intervals and at comparatively small expense. The rocker at its rear end is provided with a segmental cavity 29 and with a segmental notch 30 above and inward of the same, the mouth of said notch being smaller, preferably, than its body, for a purpose which will be hereinafter explained.

31 designates a comparatively stiff spring which comprises a pair of similar arms formed by bending a suitable strip of spring metal to semicircular form and turning said arms at their free ends toward each other, as at 32. The semicircular portion of said spring is fitted securely in the segmental cavity 29 of the rocker, while the opposite ends of the said spring bear against the rear side of the tension-arm and the front side of the tension-block. When the cultivator is in its operative position, as shown in Fig. 1, the upper ends of said springs embrace said tension arm and block below the abrupt inclination or shoulder 19, but when under the influence of an obstruction in its path the shovel yields said arms of the spring slide upwardly upon the tension arm and block, and are consequently spread farther apart. The effect of these operations will hereinafter appear.

33 designates an inverted approximately U-shaped spring. One side fits squarely against the front side of the spring 31 and is formed with a coil or eye at its lower end, fitting in the notch 30 of the rocker, and, owing to the fact that the mouth of said notch is contracted, it is obvious that the enlarged or coiled end of said spring cannot be disengaged therefrom except by moving it laterally, and it is furthermore obvious that this lateral movement cannot take place when the various parts of the device are properly assembled, because it is snugly embraced, as is also a part of the spring 31, by the ears 13, as shown clearly. This spring 33 I designate a "trip-spring," and its function will be presently made apparent.

In practice, the parts being in their operative positions, as shown in Figs. 1 and 2 most clearly, as the shovel comes in contact with any unusually hard and unyielding obstruction, such as the root of a tree or a rock, the shovel-carrying frame swings rearwardly upon the pivot 12, and, owing to the fact that the shouldered end of the dog 4 is in the path of the headed plug of the rocker and cannot yield, because its opposite end engages the wall of the recess 2 of the beam—an unyielding surface—said front end of the rocker is necessarily depressed, and its rear end, rising, forces the spring past the abruptly-inclined shoulder or resistance-point 19, and at the same time the free end of the trip-spring rides upwardly upon the frame. Immediately the first force of the impact of the shovel upon such obstruction is past and the spring has been forced by said first impact past the said resistance-point or shoulder 19 the resistance of the soil itself is sufficient to swing said frame back to the position indicated in Fig. 4—that is, until the shovel has assumed such position that it drags inoperatively upon the ground and forces the spring 31 farther upward upon the tension-arm, and the trip-spring in the same direction until its free end snaps back upon the shoulder 14. The parts now are in the position shown in Fig. 4, as the weighted end of the dog throws its shouldered end up into the notches 3. The driver now to reset the shovel in its operative position simply grasps the handle (not shown) and raises the beam sufficiently high to permit the shovel-carrying frame by gravity to swing downwardly. This it does instantaneously and with considerable force, owing to its weight. Just before it reaches its original position and as the plug end of the rocker has assumed a position below the shouldered end of the dog the trip-spring strikes against the toe 7 of said dog and swings it in the direction indicated by the arrow, Fig. 4, so as to throw its shouldered end rearward of the head of the plug of the rocker. The spring then glances from said toe into engagement with the heel 6 of said dog, and, owing to the fact that the lug 8 is in engagement with the unyielding surface of the recess 2, hereinbefore referred to, the spring this time yields, and consequently causes the depression of the rear end of the rock-arm and the downward movement of the spring 31 upon the tension-arm to its original position below the shoulder or resistance-point 19. The same movement of the rocker also reëlevates the head of the plug 27 forward of the shouldered end of the dog, and the shovel consequently is again in its operative position, and will not yield rearwardly under any pressure short of that necessary to slide the spring 31 upward past the resistance-point 19 of the tension-arm.

Thus it will be seen that I have produced a spring-trip cultivator which may be adjusted to accommodate varying degrees of hardness of the soil to be acted upon and which will yield to any obstruction which affords a resistance greater than that to which the spring 31 is gaged.

It is also obvious that I have produced a spring-trip cultivator which is simple, strong, durable, compact, and comparatively inexpensive of construction.

It is to be understood, of course, that various changes may be made in the form, proportion, arrangement, or detail construction of the parts without departing from the spirit and scope or sacrificing any of the advantages of my invention.

Having thus described the invention, what I claim as new, and desire to secure by Letters Patent, is—

1. In a spring-trip cultivator, the combination with the beam, of a shovel-carrying frame pivoted thereto, and provided with a contracting or tapering tension-arm, devices locking said frame and beam together, and a spring actuating said devices and engaging normally the contracted end of the tension-arm, substantially as described.

2. In a spring-trip cultivator, the combination with a beam, of a shovel-carrying frame pivoted thereto, and provided with a contracting tension-arm having a substantially abrupt shoulder or point of resistance near its lower end, devices locking said beam and frame together, and a spring actuating said devices and engaging the tension-arm normally just below said abrupt shoulder or point of resistance, substantially as and for the purpose set forth.

3. In a spring-trip cultivator, the combination with the beam, and a dog pivoted thereto, of a shovel-carrying frame pivoted to the cultivator, and a spring-actuated rocker carried by the frame and engaging said dog, which is adapted to be pivotally operated by reason of said engagement when the shovel encounters an unusual resistance, and thereby permit it to swing back out of the way as the cultivator advances, substantially as described.

4. In a spring-trip cultivator, the combination with the beam, and a dog pivoted to and depending from the same, of a shovel-carrying frame pivoted to the beam and provided with a tension-arm, a rocker carried by said frame and engaged by said dog, and a spring engaging the opposite end of said rocker and said tension-arm, substantially as and for the purpose described.

5. In a spring-trip cultivator, the combination with the beam, and a dog pivoted to and depending from the same, of a shovel-carrying frame pivoted to said beam and provided at its upper end with a tension-arm, and below said dog with a lug, a rocker carried by said frame and engaging said dog in advance of its axis, and resting upon said lug in rear of its axis, and a spring engaging the rear end of said rocker and said tension-arm, substantially as described.

6. In a spring-trip cultivator, the combination with the beam, of a shovel-carrying frame pivoted thereto, and provided with a downwardly-contracting tension-arm, devices locking said frame and beam together, and an approximately U-shaped spring holding said devices interlocked and having its free ends pressing against opposite sides of said contracting tension-arm, substantially as described.

7. In a spring-trip cultivator, the combination with the beam, of a shovel-carrying frame pivoted thereto, and provided with a downwardly-contracting tension-arm, devices locking said frame and beam together, an approximately U-shaped spring holding said devices interlocked and having its free ends pressing against opposite sides of said contracting tension-arm, and means to increase the width of said tension-arm and thereby afford greater resistance to the sliding action of the spring, substantially as described.

8. In a spring-trip cultivator, the combination with the beam, of a shovel-carrying frame pivoted thereto, and provided with a downwardly-contracting tension-arm, devices locking said frame and beam together, an approximately U-shaped spring holding said devices interlocked and having its free ends pressing against opposite sides of said contracting tension-arm, a wedge-block slidingly mounted upon and forming a part of said tension-arm, and means to adjust the same longitudinally, and thereby increase or diminish the width of said arm, substantially as described.

9. In a spring-trip cultivator, the combination with the beam, of a shovel-carrying frame pivoted thereto, and provided with a downwardly-contracting tension-arm, devices locking said frame and beam together, an approximately U-shaped spring holding said devices interlocked and having its free ends pressing against opposite sides of said contracting tension-arm, and a wedge-shaped block carried by and forming a part of said tension-arm, and provided with a threaded stem, and a set-screw engaging said stem and bearing against the lower end of the tension-arm, substantially as and for the purpose described.

10. In a spring-trip cultivator, the combination with the beam, of a shovel-carrying frame pivoted thereto, and comprising a pair of similar members arranged at opposite sides of the beam and each provided with a rearwardly-projecting arm having parallel depending extensions which diminish in width, and each provided with obliquely-extending ribs, a wedge-block arranged slidingly between said extensions and bearing against said ribs, and provided with a threaded stem, a set-screw engaging said threaded stem and the lower end of said extensions, devices locking the frame and beam together, and a spring holding said devices interlocked, and engaging the tension-arm formed conjointly by said extensions and said wedge-block, substantially as described.

11. In a spring-trip cultivator, the combination with the beam, and a dog pivoted to its lower end, of a shovel-carrying frame pivoted to the beam, a rocker carried by the beam, a spring holding its lower end elevated, and a spring holding the front end of the dog depressed and in the path of rearward movement of said rocker, substantially as described.

12. In a spring-trip cultivator, the combination with the beam, and a dog pivoted to and projecting below its lower end, of a shovel-carrying frame pivoted to the beam, and provided with a tension-arm, a rocker, and springs carried by said rocker and holding the same and the dog interlocked, and one of them engaging said tension-arm, substantially as described.

13. In a spring-trip cultivator, the combination with the beam, and a dog pivoted to and projecting below its lower end, of a shovel-carrying frame pivoted thereto and provided with a tension-arm, and with a shoulder, a spring engaging the tension-arm, a second spring holding the front end of the dog depressed and a rocker mounted upon the frame and supporting said springs and held by one of them into engagement with said dog, which rocker, under an unusual resistance to the shovel, is depressed by the dog until their disengagement is complete, and said first-named spring has been moved upwardly upon the tension-arm and the free end of the last-named spring has become engaged with the shoulder of the frame, substantially as described.

14. In a spring-trip cultivator, the combination with the beam, provided with a recess in its lower end, and a dog pivoted in said recess and projecting beyond the rear and lower edges of the beam, of a shovel-carrying frame pivoted to the beam and provided with a shoulder disposed opposite the rear end of said dog, with a lug below the beam, and with a depending tension-arm rearward of the beam, a rocker mounted upon said frame above said lug, a spring engaging said rocker and said tension-arm, and a second spring carried by said rocker and having its free end engaging the shoulder of the frame, and adapted, as the shovel-carrying frame swings downwardly and forwardly from its inoperative position, to strike the dog and raise its rear end until it contacts with the beam and its lower end is depressed in the path of rearward movement of the rocker, and then by such frictional engagement with the relatively-immovable dog to be forced from engagement with said shoulder to permit the tension-spring to move downwardly and the rocker to interlock with the dog, substantially as described.

In testimony whereof I affix my signature in presence of two witnesses.

GEORGE E. COPPEN.

Witnesses:
G. Y. THORPE,
M. R. REMLEY.